United States Patent
Haronian et al.

(10) Patent No.: US 12,209,928 B2
(45) Date of Patent: Jan. 28, 2025

(54) SYSTEM FOR CALCULATING WEIGHT CENTER DEVIATION FROM VEHICLE GEOMETRIC CENTER

(71) Applicant: Enervibe Ltd., Airport City (IL)

(72) Inventors: Dan Haronian, Efrat (IL); Michael Haronian, Tzur Hadasa (IL)

(*) Notice: Subject to any disclaimer, the term of this patent is extended or adjusted under 35 U.S.C. 154(b) by 263 days.

(21) Appl. No.: 17/985,852

(22) Filed: Nov. 13, 2022

(65) Prior Publication Data

US 2024/0159613 A1    May 16, 2024

(51) Int. Cl.
*G01M 1/12* (2006.01)
*G01H 1/00* (2006.01)
*G01L 17/00* (2006.01)

(52) U.S. Cl.
CPC .............. *G01M 1/122* (2013.01); *G01H 1/003* (2013.01); *G01L 17/00* (2013.01)

(58) Field of Classification Search
CPC ....... G01M 1/122; G01H 1/003; G01L 17/00; B60C 23/04; B60C 23/064; G01G 19/086; B60W 40/13; B60W 50/0098; B60W 2040/1307; B60W 2040/1315; B60W 2422/70; B60W 2530/20

See application file for complete search history.

(56) References Cited

U.S. PATENT DOCUMENTS

| | | | |
|---|---|---|---|
| 11,555,761 B1* | 1/2023 | Stowell | B60C 11/00 |
| 2021/0188252 A1* | 6/2021 | Lu | B60W 40/12 |
| 2022/0169255 A1* | 6/2022 | Sakagami | B60W 40/068 |

* cited by examiner

*Primary Examiner* — Suman K Nath

(57) ABSTRACT

A system for detecting deviation of center of weight of a vehicle from a geometric center of the vehicle while the vehicle is traveling that includes a central processor and a plurality of wheels with tires, wherein each tire includes a deformation sensor, a pressure sensor, a tire processor, and a data transmitter. The deformation sensors are attached to a specific area on the inner side of the tire, and designed to produce deformation signals by measuring or sensing frequencies and amplitudes of vibrations or bends of the tire when the specific area crosses the contact patch of the tire with the ground, and the data transmitter is designed to transmit to the central processor the deformation signals and detected tire pressures of the tires, and the central processor detects the deviation based on differences in the deformation signals and detected pressures.

6 Claims, 9 Drawing Sheets

SYSTEM FOR CALCULATING WEIGHT CENTER DEVIATION FROM VEHICLE GEOMETRIC CENTER

FIELD OF THE INVENTION

The present invention refers to a system for calculating deviation of center of weight of a traveling vehicle from a geometric center point of the vehicle.

BACKGROUND ART

In many cases, traffic accidents are caused by the fact that the center of weight of the vehicle as a result of improperly placing the load in the vehicle, especially trucks for example is not at the geometric center point or line of the vehicle. Therefore, it is important to provide a simple and cheap effective system that can report to the driver when there is a deviation of center of weight from the geometric center of the vehicle. Such a deviation is important in terms of the safety of the trip, the safety of the load, and can also cause an imbalance in the forces acting on the parts of the vehicle, such as wheels, tires, suspensions, etc. in those whose wear and tear increases when the load is not geometrically distributed evenly on the vehicle. The present invention provides efficient systems for solving the said problem.

DESCRIPTION OF THE DRAWINGS

The intention of the drawings attached to the application is not to limit the scope of the invention and its application.

The drawings are intended only to illustrate the invention and they constitute only one of its any possible implementations.

THE INVENTION

The invention refers to a system for calculating shifting of a vehicle due to load it carries or due to uneven loading on tires due to tires condition. Shifting of load may lead to shift in center of gravity that in some cases may lead to overturn of the vehicle.

Shifting of load may also take place in a dual tire of trucks where uneven tires properties may lead to overloading one of the tire.

The system uses a module that is fixed to the tire and measures ire properties such as tire pressure, tire temperature, the load on the tire and the tire vibrations. Tire pressure and temperature may be measured using state of the art pressure and temperature sensors. The load on the tire may be calculated from the deformation of the tire. For example, the patch length of the tire depends mainly on the pressure and the load on the tire. Knowing the pressure and the patch length may be used to calculate the load on the tire. The patch length may be calculated using a sensor such as an accelerometer or optical sensor that senses the deformation of the tire as it enters and exit the patch. The crossing time of the sensor of the contact patch is proportional to the patch length and therefore to the load on the tire. Therefore, the tire properties may include the tire pressure, tire temperature and the time it takes for a sensor such as accelerometer to cross the patch area. In addition, tire vibrational mode changes with the load on the tire and therefore the vibration of a tire may be used to calculate the load on the tire and changes in the vibrational mode may be used to calculate the shill in the load on a tire.

Figure 1:
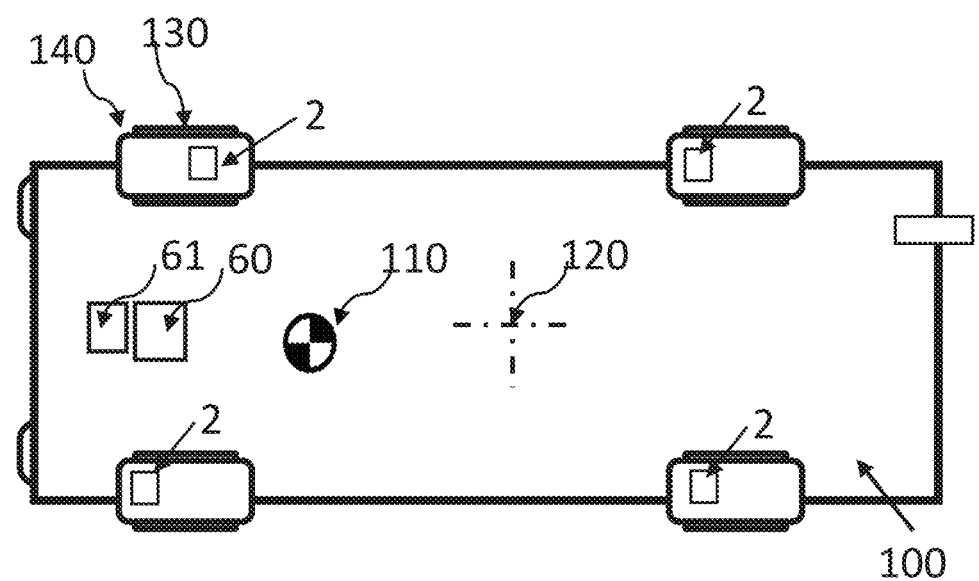
FIG. 1 is a schematic depiction of the vehicle (100) with center of weight and the geometric center.
Figure 2:
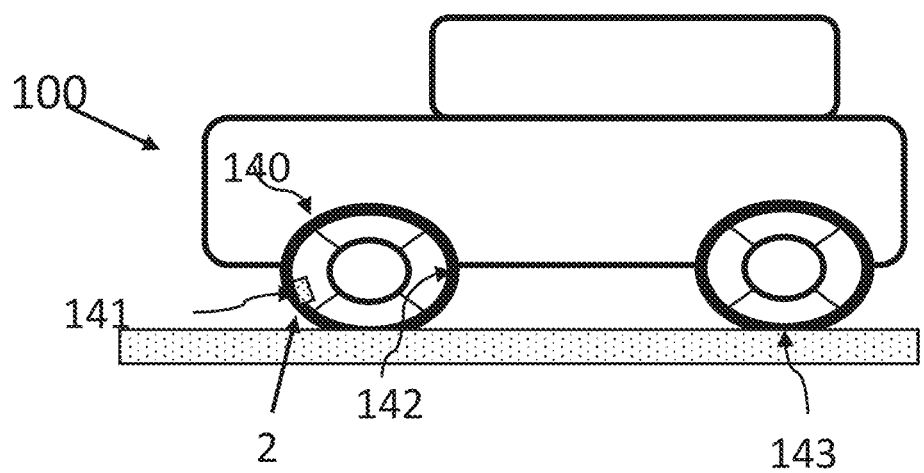
FIG. 2 depicts the vehicle with a tire (140) and the module (2).
Figure 3:
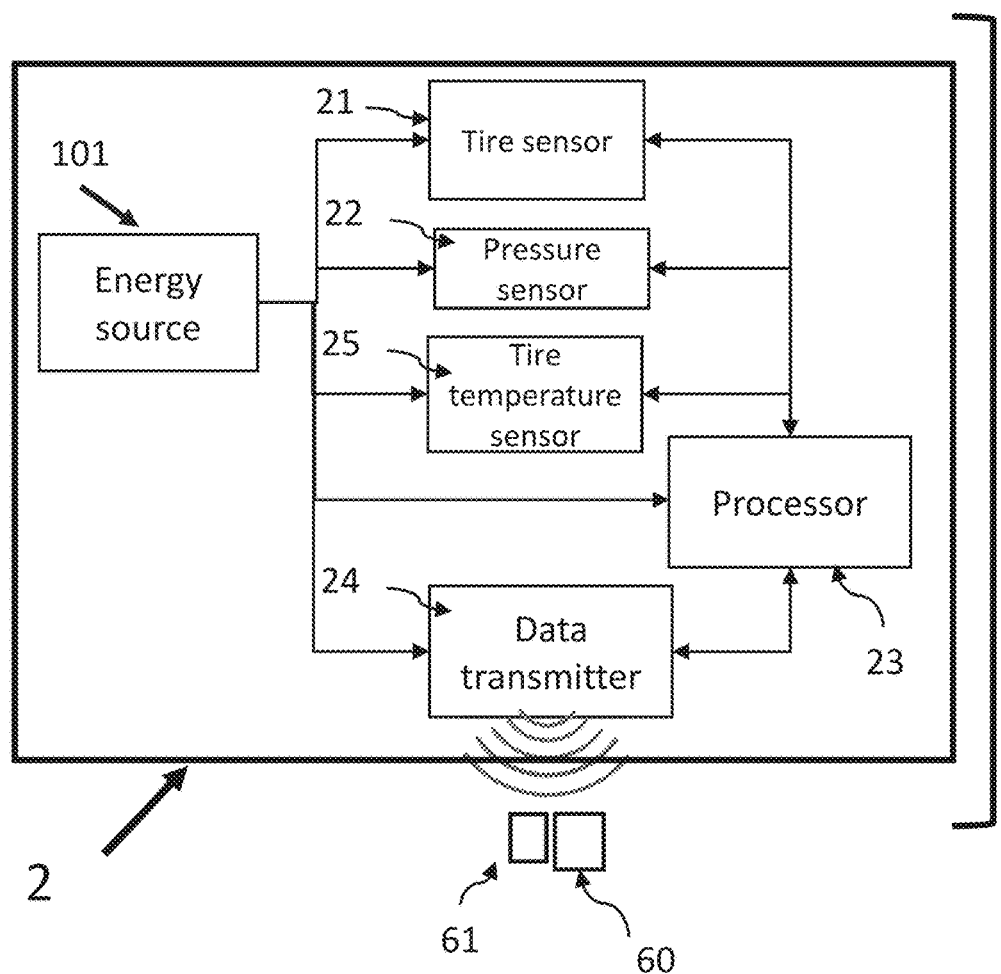
FIG. 3 is a schematic depiction of the module (2).

FIGS. 1 through 4 describe one Objective of this patent application. The object of the present invention is to provide a system (1) described in FIG. 4 for detecting deviation of center of weight (110) of a vehicle (100) from the geometric center (point or line) (120) of the vehicle. The system includes a central processor (60) with a receiver (61) that may be positioned inside the vehicle, and a plurality of wheels (130) on each of which a tire (140) is mounted. FIG. 3 describes schematically module (2) that is fixed to each tire. The module includes a tire deformation sensor (21) that is attached to a specific area (141) on the inner side (142) of the respective tire and that is designed to produce a deformation signal by measuring or sensing (optical sensor will measure for example, and Accelerometer will sense) the deformation of the tire while the specific area crosses the contact patch (143) of the tire with the ground (road) (200) or when the specific area rolls outside the contact patch (144), or both. It is noted that in this patent application a tire vibration are also considered as deformation.

Each module (2) further includes a tire pressure sensor (22) for measuring the pressure of the respective tire, a tire processor (23), and a data transmitter (24). The tire processor of each tire schedules the measurements of the temperature, pressure and deformation of the respective tire and schedules the transmission of the information about the pressure, the temperature, and the deformation signal to the central processor. The deformation sensor may be designed to produce time signals when the specific area enters the contact patch and when it leaves the contact patch, and these time signals are transmitted too by the data transmitters to the central processor. The deformation sensor may be designed to produce the vibrations of the ti re.

Each module (2) may include also a tire temperature sensor (25) for measuring the tire inner liner temperature that transmitted to the central processor by the data transmitters. Module 2 also includes an energy source that may be for example a battery or a kinetic energy harvester.

The tire processor with the transmitters in each tire are designed to transmit to the central processor the deformation signals, the detected tire pressure, the detected tire inner liner temperatures, and the time signals. The central processor is designed to detect deviation of the center of weight of the vehicle from the geometric center weight of the vehicle, directly or by calculating the center of weight of the vehicle itself, based on differences between the tires as to: (A) their deformation signals, or (B) their detected pressures, or (C) their tire inner liner temperatures, or (D) their time signals, or any combination of these parameters. The central processor is designed to provide a signal alert when detecting such deviation, and it is possible that the central IR) processor will send such signal alert only when the detected deviation is beyond a certain extent.

In addition, the central processor may perform the calculation using the speed of the vehicle. The speed of the vehicle may be received from the computer of the vehicle or from calculating the rotation rate of the tire using the deformation sensor.

The present invention refers also to the central processor (60) when it stands alone and that is designed to calculate the deviation of the center of weight of the vehicle from the geometric center of the vehicle as explained above. As explained, the central processor is designed to receive from the data transmitters in the tires the deformation signals and the detected pressures of the tires and to calculate the center of weight of the vehicle and to provide the signal alert as explained above. The central processor calculates the deviation of the center of weight of the vehicle from the geometric center of the vehicle that includes a plurality of wheels, when each of the plurality of wheels includes the module (2) that includes at least the tire deformation sensor, or the tire pressure, or the tire temperature, or a combination of them are all of them.

The present invention refers also to the tire (140) when it stands alone and that is designed to be mounted on the wheel of the vehicle while it includes the module (2) that includes at least the tire deformation sensor (21), or the tire pressure sensor (22), or the tire temperature sensor (25), along with the tire processor (23) and the data transmitter (24) that is designed to transmit to the central processor the deformation signals, the detected pressure (and other parameters when applicable) for processing to the calculation as stated above. The module in the tire is designed to communicate with the central processor (60).

Figure 5:
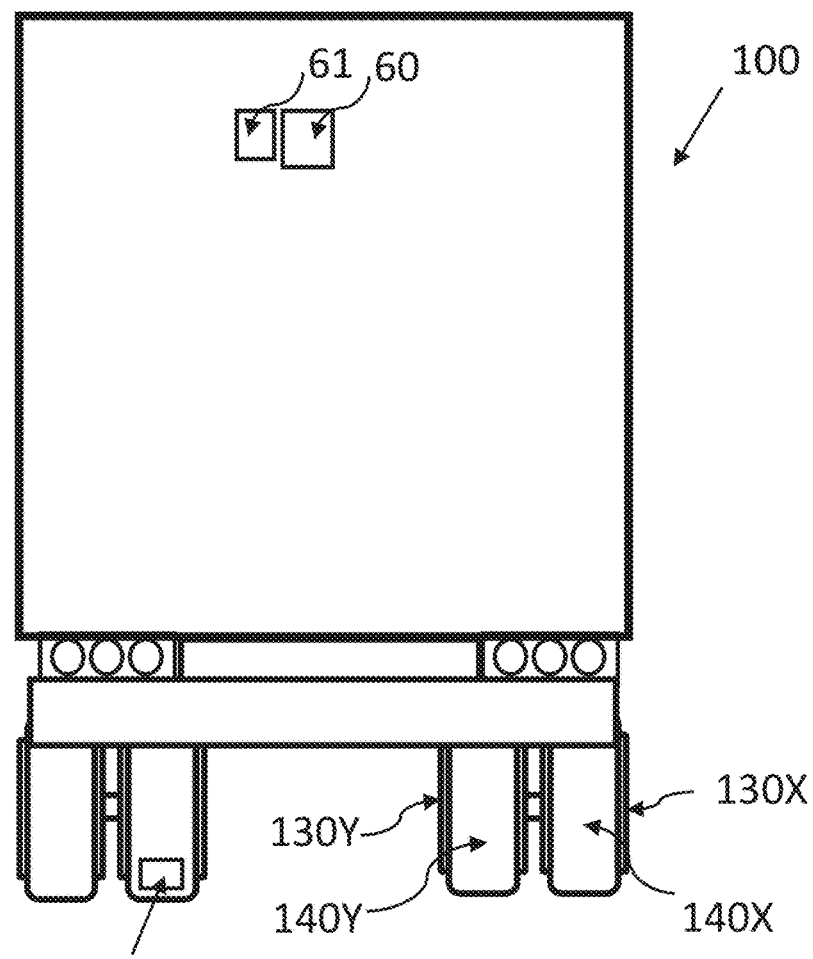
FIGS. 5 and 6 are a schematic depiction of the vehicle (100) and the system (10).
Figure 6:
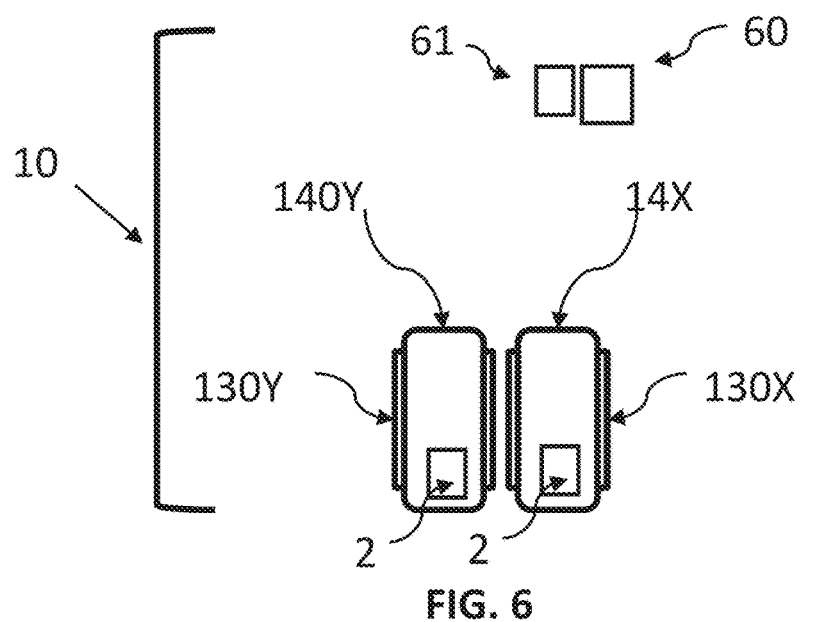

Another object of the present invention is to provide a system (10) for detecting differences of performance of a pair of adjacent inner (130Y) and outer (130X) wheels of a vehicle (100) as described in FIGS. 5 and 6. The system (10) includes the central processor (60) with the receiver (61) that can be positioned in the vehicle, an outer tire (140X) that is designed to be mounted on the outer wheel (130X) of the vehicle and an inner tire (140Y) that is designed to be mounted on the inner wheel (130Y) of the vehicle. Each tire includes the module (2) that here too in this system (10) includes at least the tire deformation sensor (21), or the tire pressure sensor (22), or the tire temperature sensor (25), along with the tire processor (23) and the data transmitter (24) that are designed to transmit to the central processor the deformation signals, the detected pressure, the tire inner liner temperatures, or the times signals of the tires (when applicable) for detecting differences of performance of the deformation signals, or the detected tire pressures, or the tire inner liner temperature or the time signals, or any combination of them or all of them.

The tire processors with the data transmitters are designed to transmit to the central processor the information, as stated above, including the detected tire pressures and the deformation signals of the outer and the inner tires. The central processor is designed to provide a signal alert when the difference or a weighted difference between the deformation signals (or other parameters) of each tire is greater than a certain extent, which serves as indication for a potential problem.

Figure 7A:
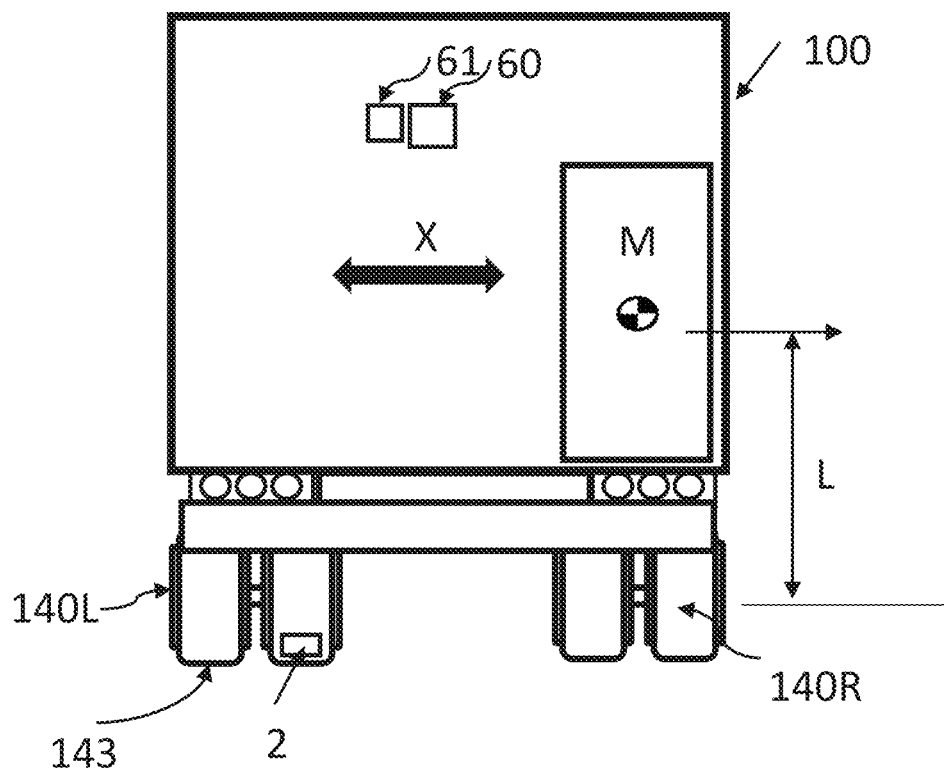
FIGS. 7A and 7B are schematic depictions of a vehicle with loads with high center of gravity and low center of gravity respectively.
Figure 7B:
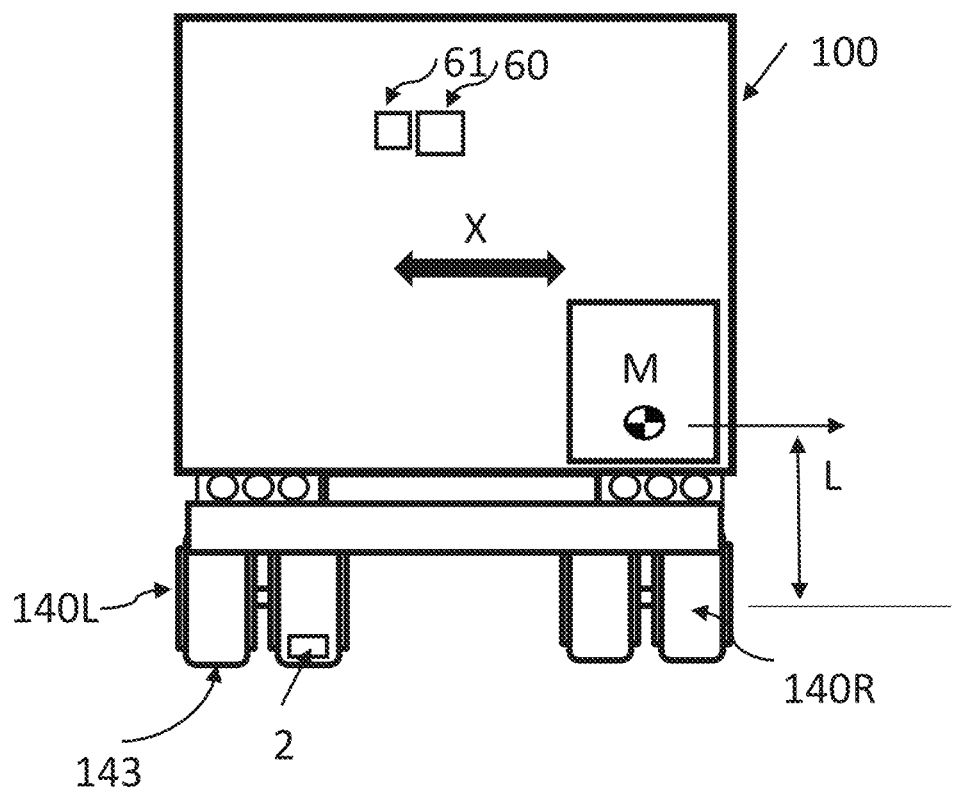

Another objective of this disclosure is described in FIG. 7A in which a low profile load is shown while a high profile load is shown in FIG. 7B. The vehicle is usually experiences rocking in the X direction (to the sides), and this may take place for example, due to road conditions or during cornering. The low profile load will result in relatively small side to side rocking compared to the high profile load because the moment it generates due to the distance L is smaller. The frequency of such rocking is typically low on the order of 1-4 Hz, and depends on the weight of the suspended part of the vehicle and on the mass M and distance L.

Figure 8:
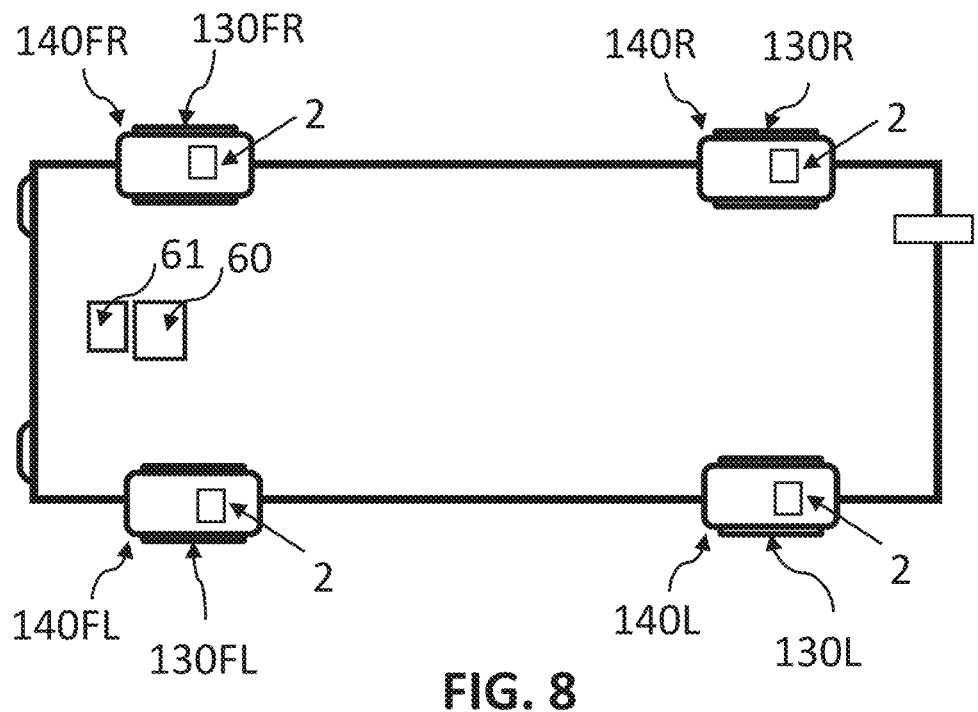
FIG. 8 is a schematic depiction of a vehicle with system 1000.
Figure 9:
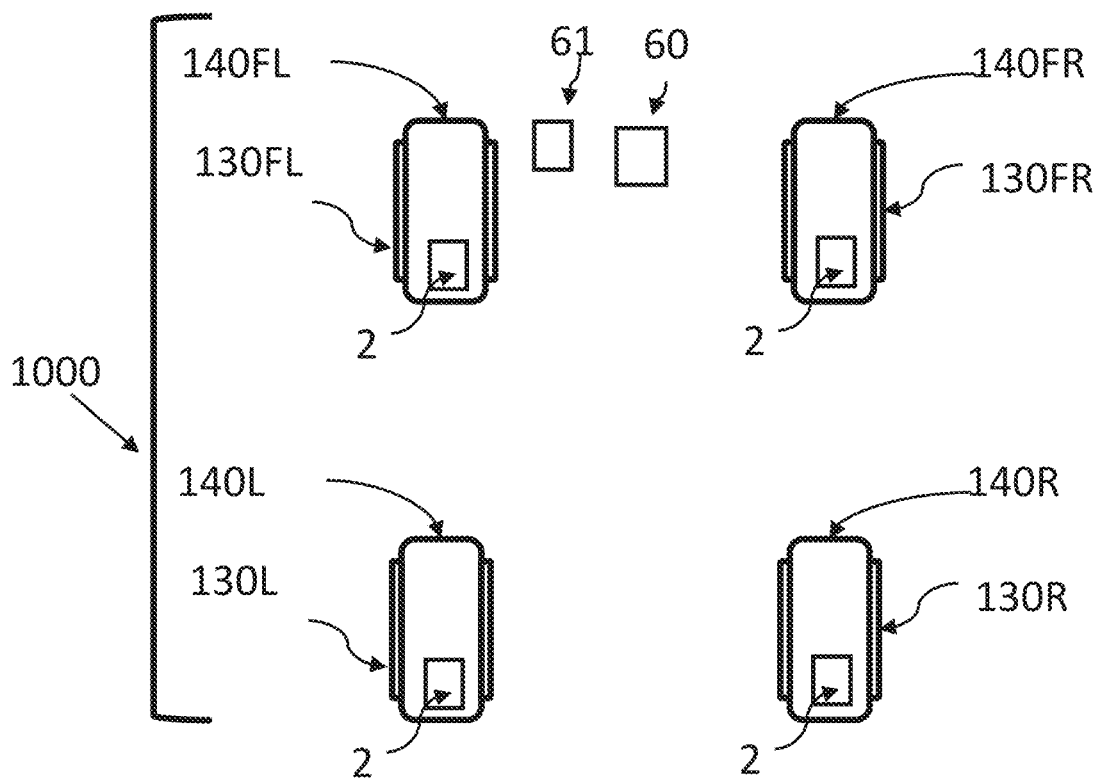
FIG. 9 is a schematic depiction of system 1000.

FIGS. 8 and 9 describe a system (1000) for detecting vehicle rocking. When the vehicle rocks from side to side the properties of the contact of the tire with the ground changed. Specifically, the contact patch length (143) is changed and may be measured by the module (2) using the deformation sensor (21) as described above Since all wheels rotate at the same rate it may be sufficient to consider only the time it takes for the deformation sensor to cross the contact patch. When the vehicle rocks the contact patch and therefore the crossing time of the contact patch oscillates as well and are anti correlated. That is the change in the contact patch length of the left tire (140L) is opposite to the change in tire of the right tire (140R), To the same extent the shape of the deformation signals of a deformation sensor such as the optical sensor, as described in FIG. 10, oscillates between high load (151) and low load (152) and is also anticorrelated between the two tires.

When the vehicle rocks the vibration spectrums of each tire oscillate and are anticorrelated. That is, an increase in the resonance frequency of one of the vibration modes in the left tire (140L) will result with a decrease in the resonance frequency of the same mode in the right tire (140R). The vibration frequency signature of a tire may be measured for example by the deformation sensor such as the optical sensor, as described in FIG. 11. In such case the vibration mode may oscillate, for example, between 552 kg to 479 kg and will be anticorrelated between the two tires.

The present invention also refers to a system (1000) for a vehicle that comprises the central processor, a right tire (140R) that is mounted on a right wheel (130R) of the vehicle and a left tire (140L) that is mounted on an opposite left wheel (130L) of the vehicle. Each tire includes a tire processor, a data transmitter, and a deformation sensor. Each deformation sensor is attached to a specific area on the inner side of the respective tire and is designed to produce the deformation signal by measuring or sensing frequencies and amplitudes of vibrations or bends of the respective tire when the specific area crosses the contact patch of the tire with the ground) and each data transmitter is designed to transmit to the central processor the deformation signals. The central processor is designed to detect frequent and cyclical changes in the time to cross the contact patch or in the vibration frequency of a specific vibration mode in the tight tire and in the left tire. A vehicle rocking phenomena takes place when the signals in the two tires are opposite and cyclical and in such case the processor is designed to provide an alert when these signals are too frequent or too high in intensity.

The deformation signals reflect also the crossing time of the deformation sensor crosses the contact patch of the tire or the vibration of a specific vibration mode of the tire. An opposite cyclical changes of the patch crossing time or in the vibration frequency of the mode in the two tires, means that when the time to cross the patch increases in one tire it decreases in the other tire, or when the frequency of the mode increase in one tire it decreases in the second tire. This opposite cyclical changes in the two tires may serves as indication that the vehicle rocks from side to side. The signal alert can be sent to the driver, to a fleet management platform, or to the vehicle ADAS in order to change the vehicle behavior and reduce the rocking or shakings of the vehicle when these changes reflect a dangerous situation.

The system (1000) may also include a front right tire (40FR) that is mounted on a front right wheel (130FR) of the vehicle and a front left tire (140FL) that is mounted on an opposite front left wheel (130FL) of the vehicle, and each of these tires includes a tire processor, a data transmitter, and a deformation sensor. Here too each deformation sensor is attached to a specific area on the inner side of the respective tire and is designed to produce deformation signals, and each data transmitter is designed to transmit to the central processor the deformation signals of the respective tire. The central processor is designed to detect frequent and cyclical changes in the deformation signals in the front right tire and in the front left tire and to provide an alert when these signals are too frequent or too high in their intensity.

A frequent and cyclical changes of the deformation signals in the tires such that these changes are cyclically opposed between the front right and the front left and between said right and left tires, may be used as indicator that that the vehicle is rocking back a fourth.

Hereinafter and for explanatory purposes only we will describe three kinds of a tire deformation sensor (21) and it is possible to implement the invention with other kinds of devices with similar capability.

Figure 11A:
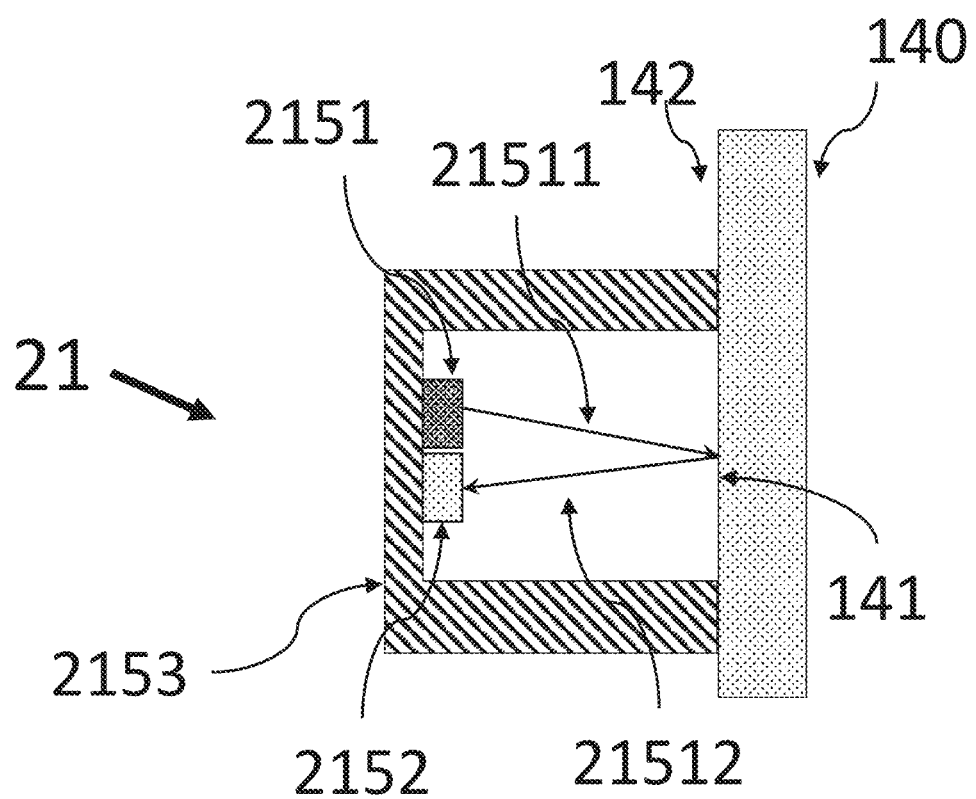
FIG. 11A is a depiction of one option of the deformation sensor (21).

One kind of a tire deformation sensor (21) is depicted in FIG. 11A and it comprises a chassis (2153), a light source (2151), and a light sensor (2152). The chassis is designed to be attached to the inner side of the tire (142), and the light source and the light sensor are attached to the chassis in such a way that when the light source illuminates (21511) at the specific area (141) on the inner side of the tire, the returning light (21512) is detected by the light sensor. The light sensor is designed to produce the deformation signal based on changes in intensity of the detected light, and these changes reflect frequencies and amplitudes of vibrations of the tire or bends of the tire when the specific area crosses the contact patch of the tire with the road and outside the contact patch.

Figure 12:
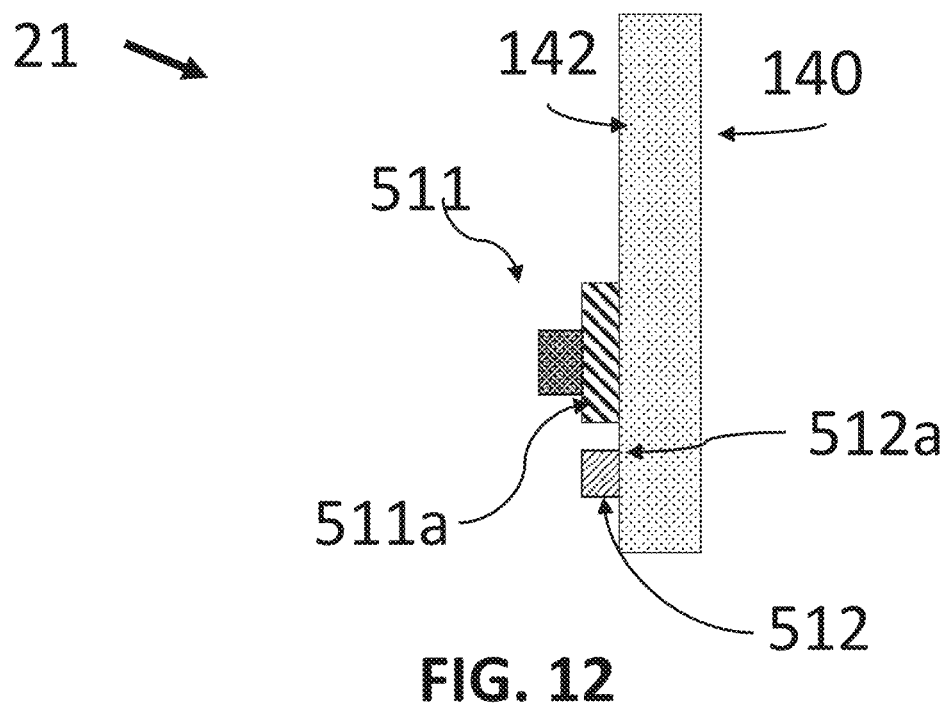
FIG. 12 is a depiction of a second option of the deformation sensor (21).

A second kind of a tire deformation sensor (21) is depicted in FIG. 12 and it comprises a magnetic sensor (510) and a magnet (512) that is position at close proximity (512a) to the magnetic sensor. The magnetic sensor and the magnet are attached to the inner side (142) of the tire (140) in such a way that the magnetic sensor generates signal due to changes in the magnetic field as a result of a movement of the magnet when it crosses the patch and as a result of tire vibrations.

Figure 13:
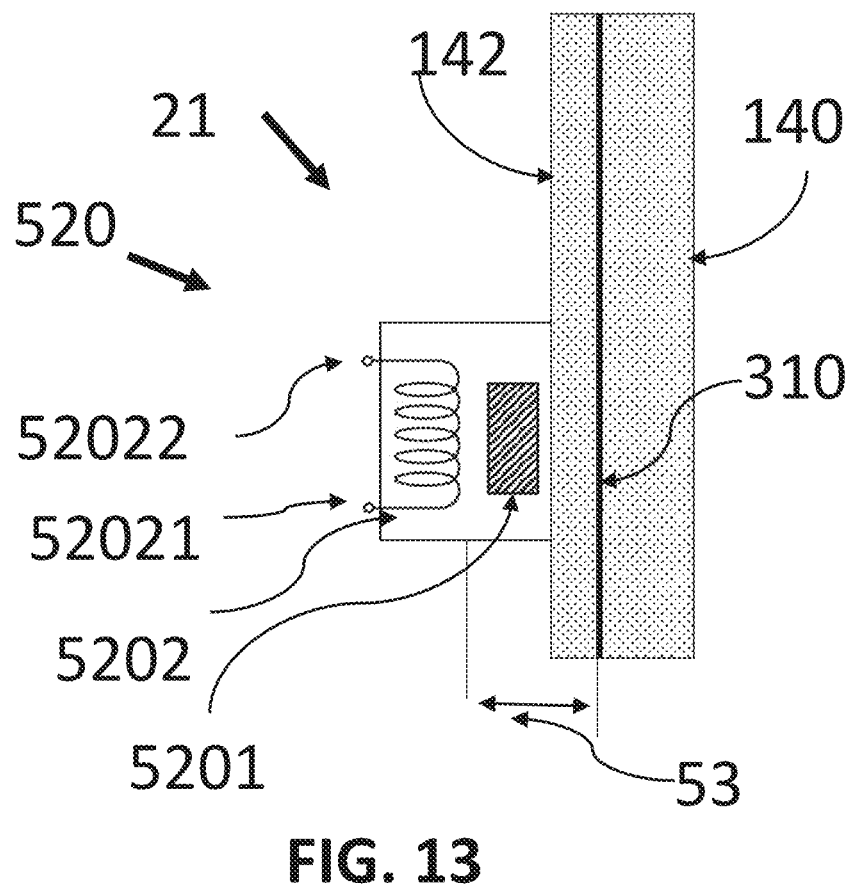
FIG. 13 is a depiction of a third option of the deformation sensor (21)

A third kind of a tire deformation sensor (21) is an electromagnetic sensor (520) that is depicted in FIG. 13. The electromagnetic sensor may be comprised of a magnet (5201) and a coil (5202). The electromagnetic sensor is designed to be attached to the inner side of the tire (142) that is reinforced by a steel mesh (310) in such a way that the electromagnetic sensor generates a voltage across the terminals (52021, 52022) of the coil (5202) when the steel mesh changes its position (53) relative to the coil and to the magnet as a result of bending while crossing the contact patch and as a result of tire vibrations. These changes reflect frequencies and amplitudes of vibrations or bends of the tire when the electromagnetic sensor crosses the contact patch of the tire with the road and outside the contact patch.

A fourth kind of a tire deformation sensor (21) is an accelerometer (530) that is attached to the inner side of the tire (142) and sense the entrance and exit from the contact patch, as depicted in FIG. 10.

A fifth kind of a tire deformation sensor (21) is a strain gauge (540) that is attached to the inner side of the tire (142) and sense the strain of the tire as a result of bending while crossing the contact patch and as a result of tire bending when the sensor crosses the contact patch and as a result of tire vibrations. These changes reflect frequencies and amplitudes of vibrations or bends of the tire when the strain gauge sensor crosses the contact patch of the tire with the road and outside the contact patch, as depicted in FIG. 11.

Figure 4:
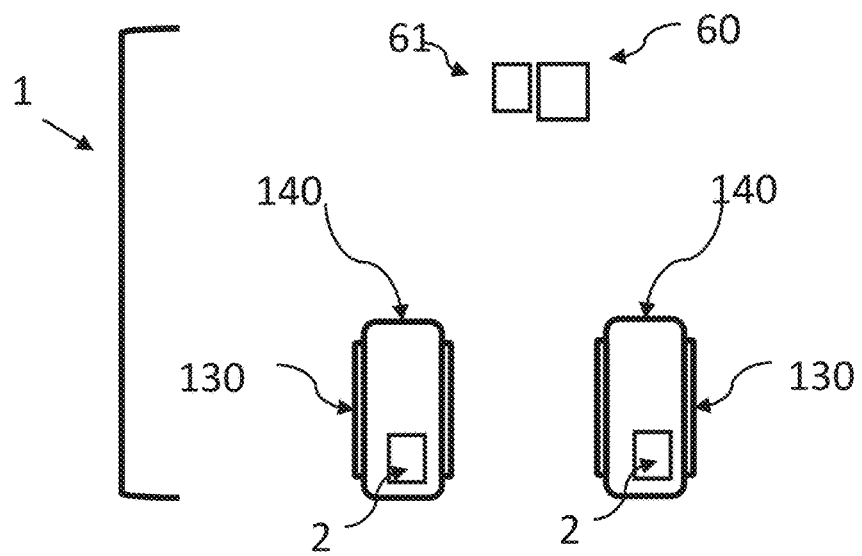
FIG. 4 is a schematic depiction of system (1).
Figure 10A:
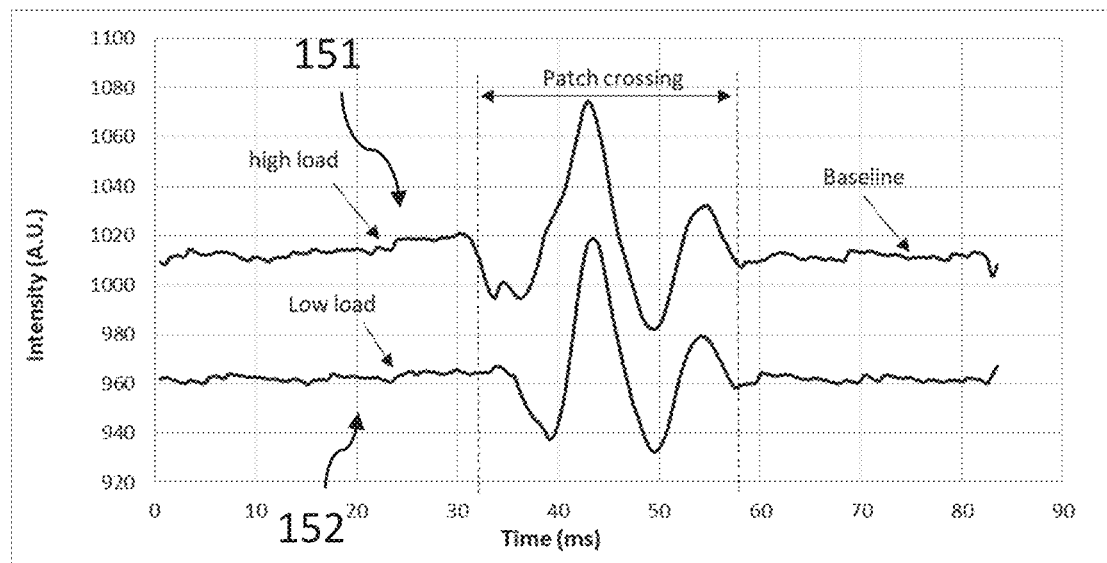
FIG. 10A is a recording of the optical sensor of module (2) for high and low tire loads.
Figure 10B:
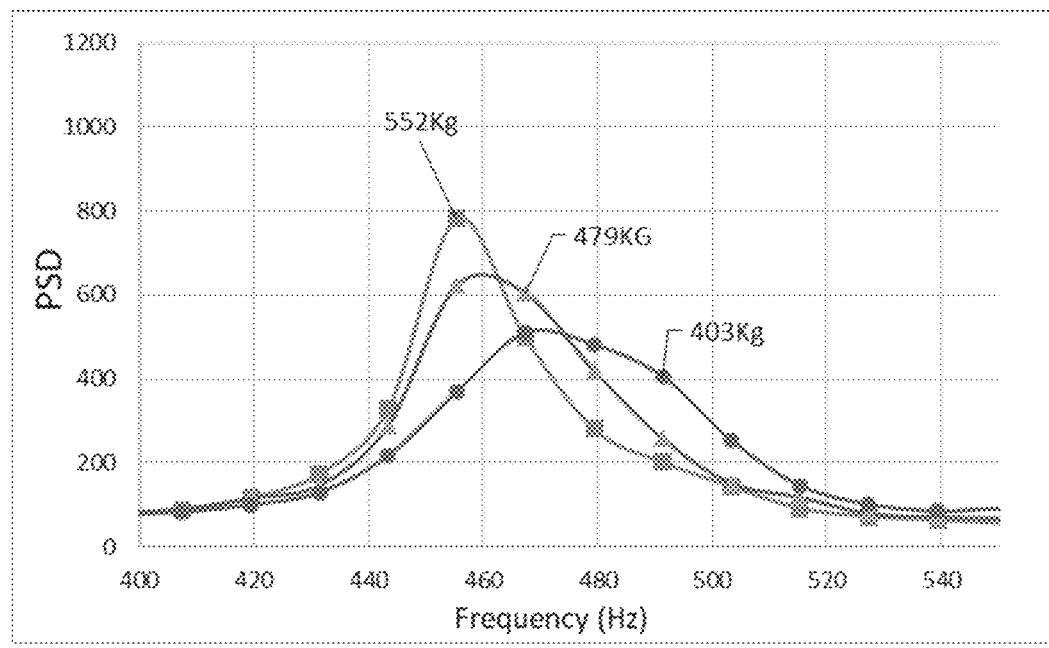
FIG. 10B is the frequency recording of one of a tire modes when the tire is under different loads.
Figure 11B:
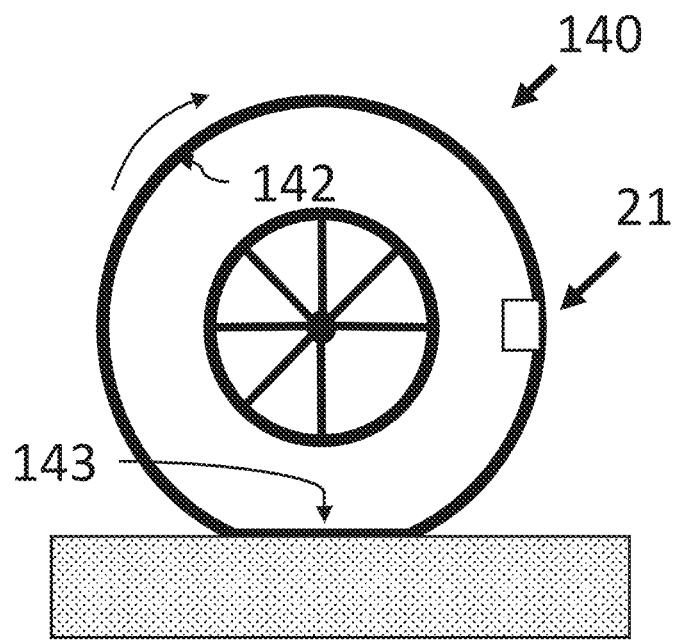
FIG. 11B depicts the contact patch (143).
Figure 14:
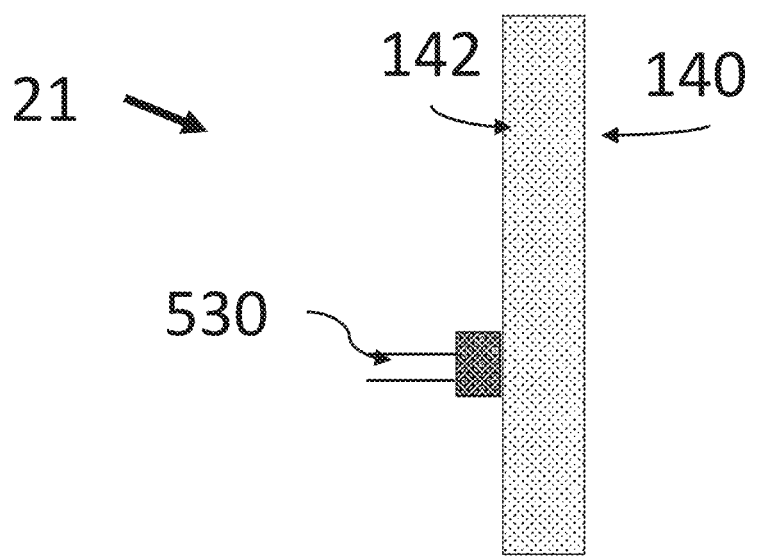
FIG. 14 is a depiction of a fourth option of the deformation sensor (21).

FIG. 1 is a schematic depiction of the vehicle (100) with center of weight and the geometric center. FIG. 2 depicts the vehicle with a tire (140) and the module (2), FIG. 3 is a schematic depiction of the module (2). FIG. 4 is a schematic depiction of system (1). FIGS. 5 and 6 are a schematic depiction of the vehicle (100) and the system (10). FIGS. 7A and 7B are schematic depictions of a vehicle with loads with high center of m gravity and low center of gravity respectively. FIG. 8 is a schematic depiction of a vehicle with system 1000. FIG. 9 is a schematic depiction of system 1000. FIG. 10A is a recording of the optical sensor of module (2) for high and low tire loads. FIG. 10B is the frequency recording of one of a tire modes when the tire is under different loads. FIG. 11A is a depiction of one option of the deformation sensor (21). FIG. 11B depicts the contact patch (143). FIG. 1.2 is a depiction of a second option of the deformation sensor (21). FIG. 13 is a depiction of a third option of the deformation sensor (21). FIG. 14 is a depiction of a fourth option of the deformation sensor (21).

Figure 15:
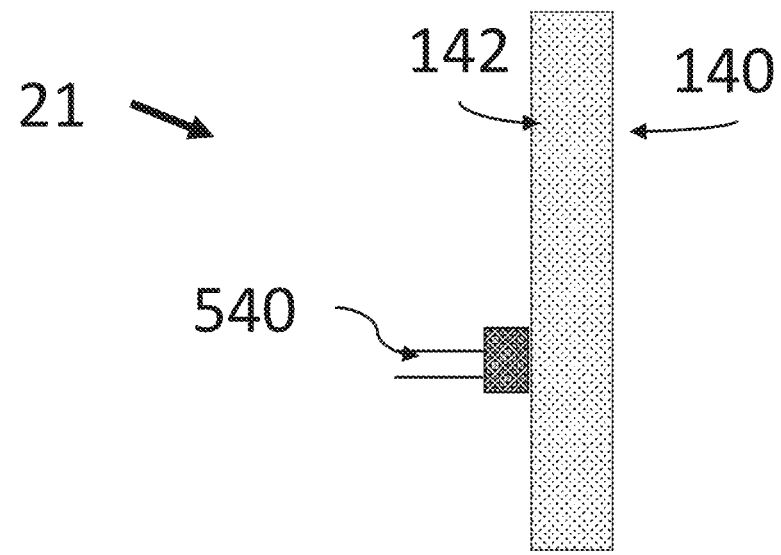
FIG. 15 is a depiction of a fifth option of the deformation sensor (21).

FIG. 15 is a depiction of a fifth option of the deformation sensor (21).

A tire has more than one vibration mode. In this patent application reference was made to a tire vibration mode. It is understood that more than one vibration mode may be used for sensing tire condition.

What is claimed is:

1. A system for detecting deviation of center of weight of a vehicle from a geometric center of the vehicle while the vehicle is traveling that comprises a central processor and a plurality of wheels on each of which a tire is mounted;
   wherein each tire includes a deformation sensor, a pressure sensor, a tire processor, and a data transmitter;
   wherein each of the deformation sensor is attached to a specific area on an inner side of a respective tire, and designed to produce a deformation signal by measuring or sensing frequencies and amplitudes of vibrations or bends of the respective tire when the specific area crosses a contact patch of the respective tire with the ground;
   wherein each of the pressure sensor is designed to detect the tire pressure of the respective tire;
   wherein each of the data transmitter is designed to transmit to the central processor deformation signals and a detected tire pressure of the respective tire;
   wherein each of the tire processor is configured to schedule pressure and deformation measurements by the deformation and pressure sensors of the tire and to schedule transmissions of pressure and deformation measured information to the central processor of the tire;
   wherein the central processor is designed to detect deviation of the center of weight of the vehicle from the geometric center of the vehicle based on differences in deformation signals and detected pressures between the tires, and to provide a signal alert when detecting said deviation or when the deviation is beyond a certain extent.

2. The system of claim 1 wherein each of the tire further includes a temperature sensor that is designed to measure a tire inner liner temperature of the tire, wherein said data transmitter is designed to transmit to said central processor the detected tire inner liner temperature of the respective tire, and wherein the central processor is designed to process said detect said deviation based on said differences between said deformation signals and said detected pressures of each tire and further based on detected tire inner liner temperatures of the tires.

3. A central processor of a system for detecting deviation of center of weight of a vehicle from a geometric center of the vehicle while the vehicle is traveling that is designed to communicate with a plurality of wheels of the vehicle on each of which a tire is mounted, wherein each tire includes a deformation sensor, a pressure sensor, a tire processor, and a data transmitter;
wherein each of the deformation sensor is designed to be attached to a specific area on an inner side of a respective tire, and designed to produce a deformation signal by measuring or sensing frequencies and amplitudes of vibrations or bends of the respective tire when the specific area crosses a contact patch of the respective tire with the ground;
wherein each of the pressure sensor is designed to detect the tire pressure of the respective tire;
wherein each of the data transmitter is designed to transmit to the central processor deformation signals and detected tire pressure of the respective tire;
wherein each of the tire processor is configured to schedule pressure and deformation measurements by the deformation and pressure sensors of the tire and to schedule transmissions of pressure and deformation measured information to the central processor of the tire;
wherein the central processor is designed to detect deviation of the center of weight of the vehicle from the geometric center of the vehicle based on differences in deformation signals and detected pressures between the tires, and to provide a signal alert when detecting said deviation or when the deviation is beyond a certain extent.

4. A system for detecting difference of performance between a pair of adjacent inner and outer wheels of a vehicle while the vehicle is traveling that comprises a central processor, an outer tire that is mounted on the outer wheel and an inner tire that is mounted on the inner wheel of the vehicle, wherein each tire includes a tire processor, a data transmitter, a deformation sensor, a pressure sensor, and a temperature sensor;
wherein each of the deformation sensor is attached to a specific area on an inner side of the respective tire, and is designed to produce a deformation signal by measuring or sensing frequencies and amplitudes of vibrations or bends of the respective tire when the specific area crosses a contact patch of the respective tire with the ground; wherein each of the pressure sensor is designed to detect a tire pressure of the respective tire; wherein each temperature sensor is designed to detect an inner liner tire temperature of the respective tire;
wherein each of the data transmitter is designed to transmit to the central processor deformation signals of the respective tire when the deformation sensor is included in the respective tire, a detected tire pressure of the respective tire when the pressure sensor is included in the respective tire, and detected inner liner tire temperature of the respective tire when the temperature sensor is included in the respective tire;
wherein each of the tire processor is configured to schedule pressure and deformation measurements by the deformation and pressure sensors of the tire and to schedule transmissions of pressure and deformation measured information to the central processor of the tire; and
wherein the central processor is designed to detect difference of performance between the tires based on said deformation signals, said detected tire pressures, said detected tire temperatures, or time signals that said deformation sensor is designed to produce when the specific area enters the contact patch and when it exits the contact patch, and to provide a signal alert when the difference is detected or when the detected difference is greater than a certain extent.

5. A system for a vehicle that comprises a central processor, a right tire that is mounted on a right wheel of the vehicle and a left tire that is mounted on an opposite left wheel of the vehicle, wherein each tire includes a tire processor, a data transmitter, and a deformation sensor;
wherein each of the deformation sensor is attached to a specific area on an inner side of the respective tire and is designed to produce a deformation signal by measuring or sensing frequencies and amplitudes of vibrations or bends of the respective tire when the specific area crosses a contact patch of the respective tire with the ground, and wherein each of the data transmitter is designed to transmit to the central processor deformation signals of the respective tire;
wherein each of the tire processor is configured to schedule deformation measurements by the deformation sensor of the tire and to schedule transmissions of deformation measured information to the central processor of the tire;
wherein the central processor is designed to detect a frequent and cyclical change in the deformation signals in the right tire and in the left tire; and
wherein the central processor is designed to provide an alert when detecting above certain level of frequent and above certain level of cyclical changes in the deformation signals of the tires and when the changes are cyclically opposed between the tires.

6. The system of claim 5 that further includes a front right tire that is mounted on a front right wheel of the vehicle and a front left tire that is mounted on an opposite front left wheel of the vehicle, wherein each of the front right tire and the front left tire include a second and third tire processor, a second and third data transmitter, and a second and third deformation sensor;
wherein each deformation sensor is attached to a specific area on an inner side of the respective tire and is designed to produce a deformation signal by measuring or sensing frequencies and amplitudes of vibrations or bends of the respective tire when the specific area crosses a contact patch of the respective tire with the ground, and wherein each data transmitter is designed to transmit to the central processor deformation signals of the respective tire;
wherein the central processor is designed to detect a frequent and cyclical changes in the deformation signals in the front right tire and in the front left tire; and wherein the central processor is designed to provide an alert when detecting above certain level of said frequent and above certain level of said cyclical changes in said deformation signals of said right and left tires and when detecting frequent and cyclical changes in deformation signals of the front right and front left tires when said changes are cyclically opposed between the front right and the right tires and the front left and the left tires.

\* \* \* \* \*